Figure 1:
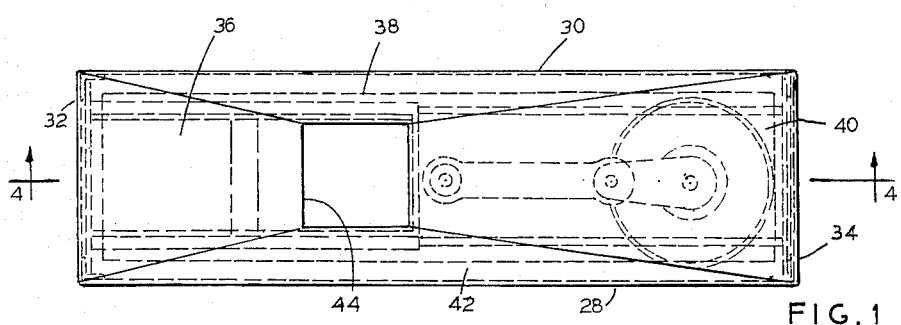

Jan. 26, 1965  P. T. VINETTE  3,167,102
POTATO SLICER

Filed June 12, 1962  6 Sheets-Sheet 1

INVENTOR.
PETER T. VINETTE

BY

ATTORNEY

Jan. 26, 1965   P. T. VINETTE   3,167,102
POTATO SLICER

Filed June 12, 1962   6 Sheets-Sheet 2

INVENTOR.
PETER T. VINETTE
BY
ATTORNEY

Jan. 26, 1965 P. T. VINETTE 3,167,102
POTATO SLICER

Filed June 12, 1962 6 Sheets-Sheet 3

INVENTOR.
PETER T. VINETTE

BY

ATTORNEY

Jan. 26, 1965
P. T. VINETTE
3,167,102
POTATO SLICER
Filed June 12, 1962
6 Sheets-Sheet 4
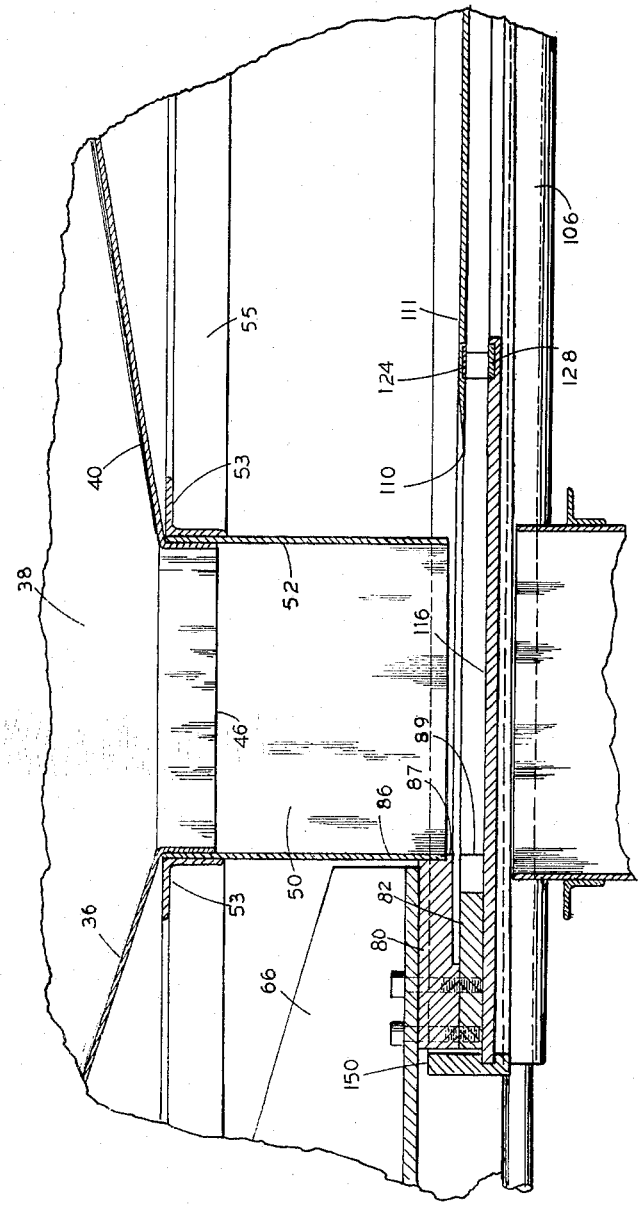
FIG. 6
INVENTOR.
PETER T. VINETTE
BY 
ATTORNEY Jan. 26, 1965 P. T. VINETTE 3,167,102
POTATO SLICER
Filed June 12, 1962 6 Sheets—Sheet 5

INVENTOR.
PETER T. VINETTE
BY
ATTORNEY

Jan. 26, 1965 P. T. VINETTE 3,167,102
POTATO SLICER
Filed June 12, 1962 6 Sheets-Sheet 6
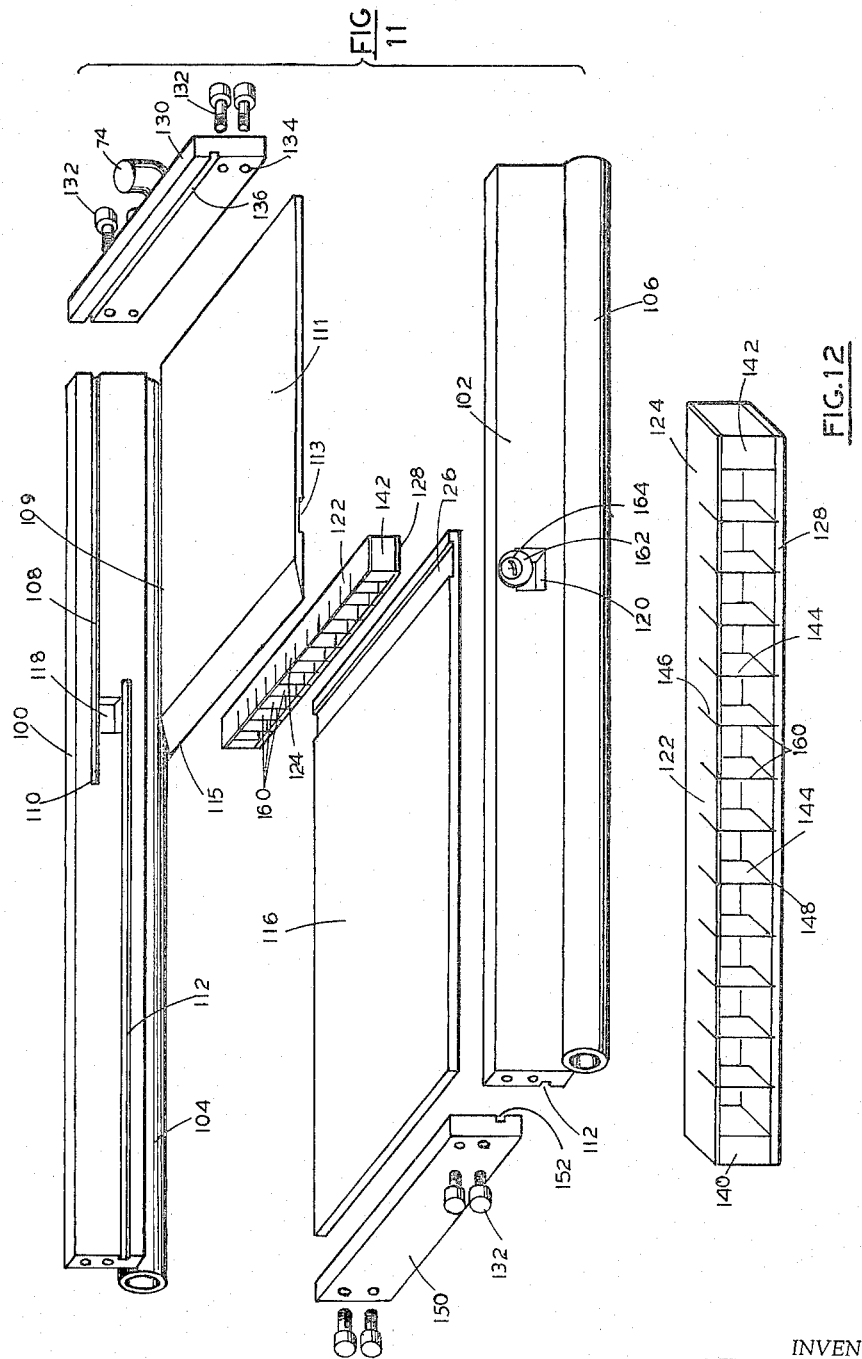
INVENTOR.
PETER T. VINETTE
BY
ATTORNEY

3,167,102
POTATO SLICER
Peter T. Vinette, 1719 Butternut St., Syracuse, N.Y.
Filed June 12, 1962, Ser. No. 202,008
5 Claims. (Cl. 146—78)

This invention relates to potato slicing machines, and more particularly to a slicer for cutting rectangular elongated potato sections such as used in the preparation of french fried potatoes.

More particularly the invention has to do with a reciprocatory knife assembly having a broad slicing blade, and a multiplicity of smaller blades disposed perpendicular to the slicing blade, the blades being disposed so that the slicing blade while initially effecting a cut through a potato, is followed by the smaller blades which cut the slice into elongated potato sections, with the slice and sections completely confined until the slicing is complete. The blade reciprocates beneath a magazine for the whole potatoes to be cut, and coacts with a complementally slotted block, which forms an abutment extension of a magazine wall coacting as a bumper for the slice when severed from the potato, and while confined completing the sectional cutting of the slice into sections. The invention further has to do with a sanitary potato hopper cover and shroud for the apparatus, and a knife assembly so constructed and arranged as to be readily disassembled for ready access to and replacement of the knives thereof.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

Figure 2:
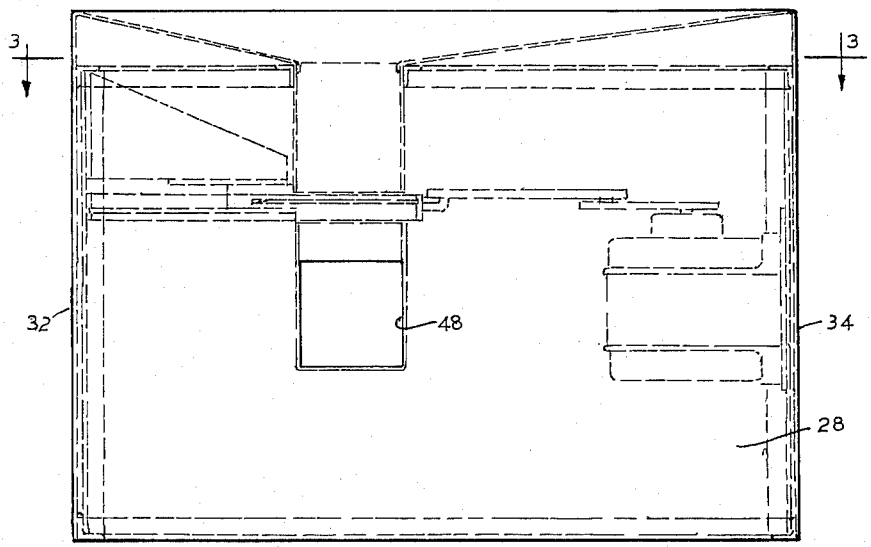
Figure 3:
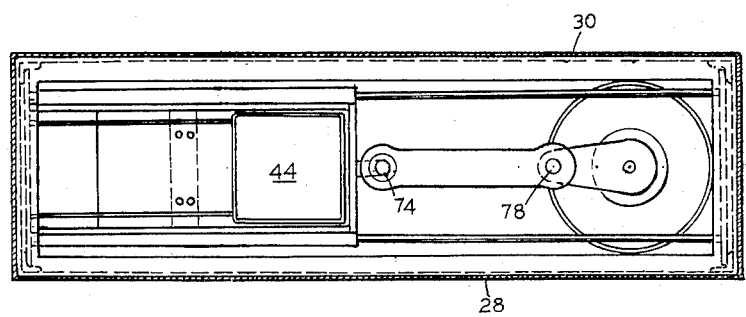
Figure 4:
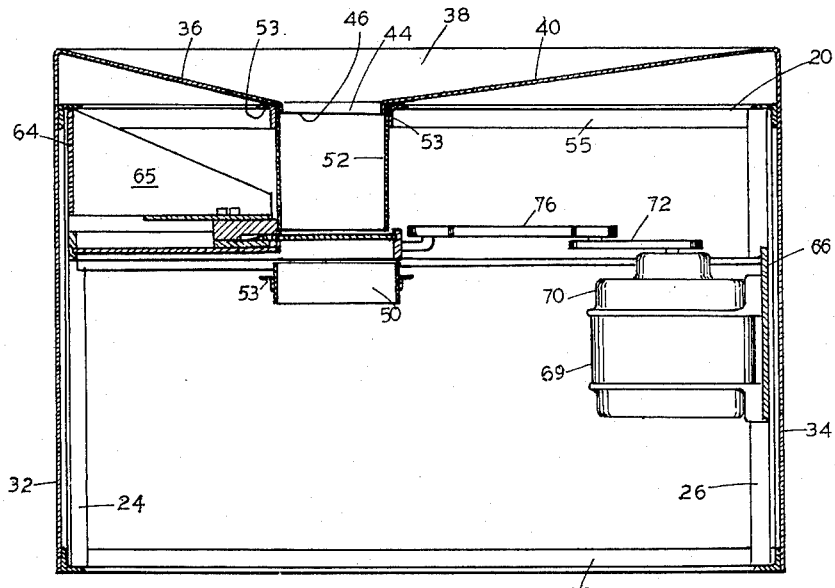
Figure 5:
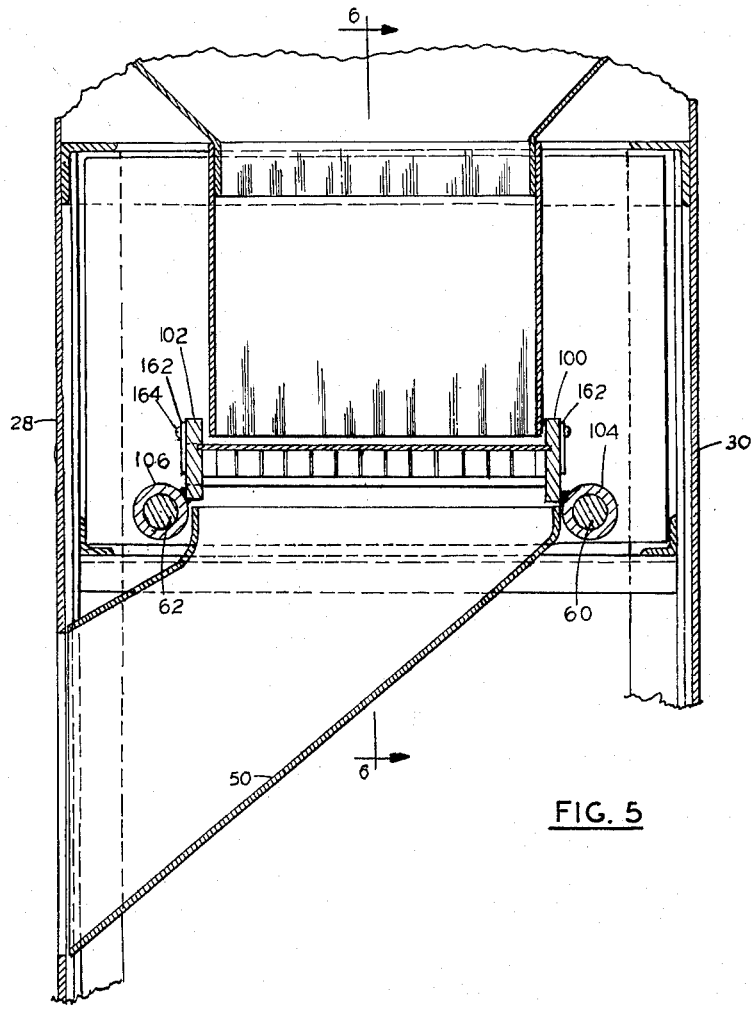
Figure 7:
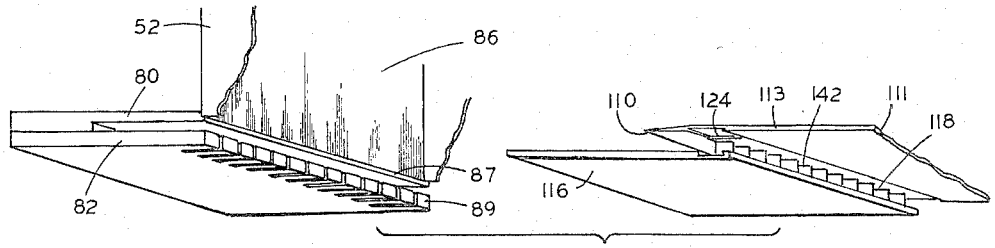
Figure 8:
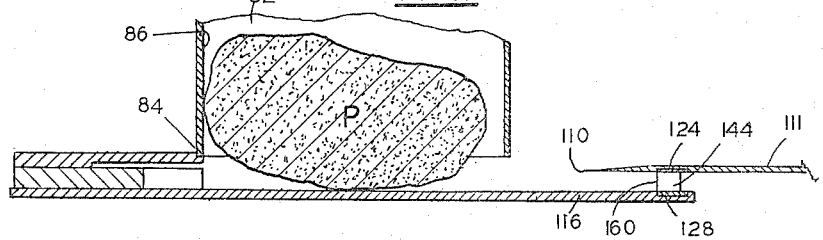
Figure 9:
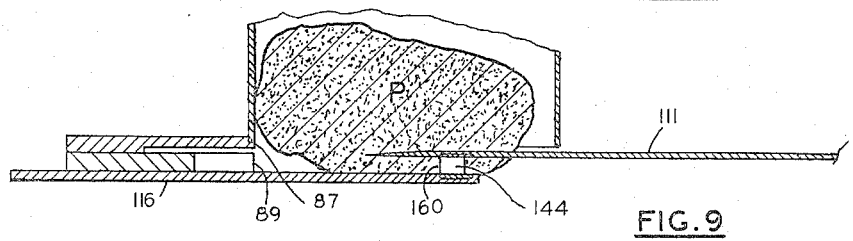
Figure 10:
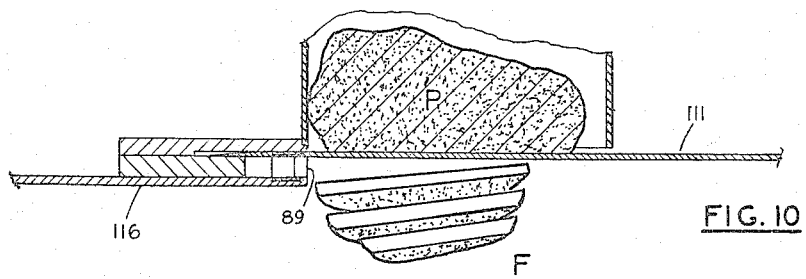

In the drawings, wherein like reference characters indicate like parts:

FIGURE 1 is a top plan view of the slicing apparatus;
FIGURE 2 is a side elevational view;
FIGURE 3 is a top plan view with the hopper and shroud removed;
FIGURE 4 is a longitudinal sectional view taken on the line 4—4 of FIGURE 3;
FIGURE 5 is an enlarged transverse sectional view taken on the line 5—5 of FIGURE 4;
FIGURE 6 is an enlarged sectional view taken on the line 6—6 of FIGURE 5;
FIGURE 7 is an illustrative perspective view from below the knives and block;
FIGURES 8, 9 and 10 are sectional diagrammatic views showing successive positions of the knives during a cutting stroke;
FIGURE 11 is an exploded view of the knife assembly parts; and
FIGURE 12 is an enlarged perspective view of the vertical knife unit of the knife assembly.

Referring to FIGURES 1–4 there is shown a potato slicer having an upper rectangular frame 20, a similar lower rectangular frame 22, corner posts 24 and 26, and a surrounding skirt or housing 27 comprising front and back panels 28 and 30, end panels 32 and 34, and a cover in the form of a hopper comprising inclined walls 36, 38, 40 and 42 sloping to a square opening 44, defined by a narrow depending flange 46. The front panel is provided with a discharge opening 48, adapted to align with an inclined chute 50 extending upwardly to a position beneath the slicing apparatus. The skirt and hopper may be a unit formed of sanitary stainless steel and may be readily lifted from the frame assembly comprising members 20 and 22. The hopper flange 46 extends into a vertical square magazine 52 supported from the frame 20 on cross members 53, and lengthwise members 55, and leads into the path traversed by the cutting knives, as will hereinafter appear.

Disposed beneath and on opposite sides of the hopper 52 are a pair of spaced parallel guide rods 60 and 62, which extend from end plates 64 and 66 mounted on the opposite ends of the frame, as to the corner angles 24 and 26 respectively. The end plate 64 forms a mount for a heavy channel bracket 65 which supports the blade block assembly 68, and the end plate 66 at the other end may form a mount for a motor 69, provided with a reduction gear 70, which can be of the planetary type. A crank 72 is driven by the reduction gear at a speed in the range of 60 r.p.m.

Slidably carried on the guide rods 60 and 62 is a knife assembly which comprises side rails 100 and 102 to which are affixed tubular sleeves 104 and 106, which are slidably disposed on the rods 60 and 62. The side rails have an end member 130 to which a right angle connecting rod pin 74 is affixed. A connecting rod 76 is journalled on the pin 74 and the crank pin 78.

A reference to FIGURE 7 is illustrative of the knife block and certain parts of the knife assembly. The knife block is composed of upper and lower members 80 and 82 rigidly bolted to the bracket 65. The upper 80 member has an offset 84 to receive the corresponding wall 86 of the magazine 52, and the magazine and the block may be secured together at the offset 84, if desired, to further rigidify the bracket 65 through the magazine support structure. The wall 86 of the magazine is aligned with and flush with the frontal faces 87 and 89 of the knife block. The block members 80 and 82 are formed to provide a horizontal main cutting blade receiving slot 90 and the lower plate is provided with a series of vertical slots 92 for receiving the vertical blades 144 of the slicing assembly.

As may be seen, in FIGURES 8, 9 and 10, for example, the knife assembly comprises, as its active elements the blade 111, with its cutting edge 115, the bottom plate 116, which slides beneath the block assembly 68 and the vertical knives 144 with their cutting edges 160. The hopper, which may be about five inches square to accommodate potatoes of generous size is disposed above the traverse of the blade 111 and plate 116. The stroke of the knife assembly will be in the order of seven and three quarter inches, so that the travel speed of the knife edge 110 when beneath the hopper will be substantial. When the blade 111 is at the beginning of its stroke, it is located in the proximate position shown in FIGURE 8, and the bottom plate 116 sliding beneath the block 68 supports the potato P. As the blade and plate move to the left during each stroke, the blade 111 commences to cut a slice from the bottom side of the potato of a maximum thickness as gaged by the spacing between the cutting edge 115 and the plate 116, and at this time the potato abuts the side wall 86 of magazine 52.

After the blade 111 has made substantial progress in the cutting of the slice S, the vertical blades enter the slice and commence to cut the slice into longitudinal sections. As shown in FIGURE 9, the slice is still supported by the main portion of the potato by reason of the unsevered portion thereof in advance of the knife blade edge 110. Once the knife blade edge 110 has completely severed the slice from the rest of the potato thereabove, the slice continues to be an integral member, although of comb like configuration. When the slice is thus severed from the rest of the potato, the slice may advance with the cutter blades 144 until the forward edge of the slice abuts the frontal face 89 of the lower block member. Thereafter the comb like slice is cut into separated longitudinal sections F, which drop into the discharge chute.

During this time, the rest of the potato rides on the upper surface of the blade 110. Upon retraction for a subsequent stroke, the remainer of the potato is allowed to drop upon the plate 116, during the substantial time during which the crank arm is rotating through dead center, prior to commencing the next cut. Thereafter an additional and subsequent slices are cut and sectioned in the manner set forth.

In FIGURE 11 the knife box assembly parts are shown in an exploded view. The spaced side rails 100 and 102 each have along their outside lower edges, guide sleeves 104 and 106, which may be brazed or welded to the rails 100 and 102. Each of the rails have a knife slot 108 on their inside faces of a depth of about a half of the thickness of the rail and extending to one end of each rail. The slots conform to the opposite side edges 109 of the blade 111, and is pointed as at 110. Each of the rails 100 and 102 have a plate slot 112 extending to the other end of the respective rails, and of a length and width corresponding to the edge 114 of the plate 116. Each of the rails is provided with rectangular apertures 118 and 120 to receive the ends of the vertical knife assembly 122. The upper and lower edges of the aperture extend half way into the width of the slots 108 and 112. The blade is provided with a transverse groove 113 of a width corresponding to that of the knife assembly 122, and of a depth equal to half the thickness of the blade, and the thickness of the top plate 124 of the knife assembly, and the plate 116 has a transverse groove 126 extending crosswise thereof adjacent one end of a depth one half the thickness of the plate to receive the knife assembly 122, the width of the groove being the same as the width of the assembly, and of a depth corresponding to the thickness of the lower plate 128 of the assembly 122. The side rails have an end member 130 secured to the ends of the rails as by bolts 132 extending through apertures 134 and threaded in the ends of the rails 100 and 102. The end member has a groove 136 adapted to receive the butt end of the blade 111.

The vertical blade assembly comprises top and bottom members 124 and 128, end blocks 140 and 142, and blades 144 set in slits 146 and 148 in the members 124 and 128. The assembly 122 is of the same length as the end member 130, and a little longer than the width of the blade 111 and plate 116. An end member 150 having a slot 152 to receive the end of plate 116 is secured to the other ends of the rails in the same fashion as end member 130. When the edges of the blade 111 and plate 116 are seated in their respective side rail grooves or slots 108 and 112, and the end members 130 and 132 assembled to the ends of the rails with the butt end of the blade and the plate end seated in slots 136 and 152 respectively, the grooves 113 and 126 will align with the rectangular apertures 118 and 120, and the knife assembly 122 may be slid in place, with the knife cutting edges 160 of the assembly facing in the same direction as the cutting edge 115 of knife 111. The assembly may be held in place by eccentric washers 162 and screws 164 affixed to the side rails adjacent the apertures 118 and 120, the washer being adapted to extend over the aperture, when in the position shown in the exploded assembly diagram to lock the assembly 122 against lateral movement.

In practice, the blade 111 and plate 116 may be spaced about 3/8" and the spacing between cutting edges 160 may be 25/64". It will be seen that when the assembly 122 is in place, the inside faces of the members 124 and 128 will be flush with the facing surfaces of the blade 111 and plate 116, and that the assembly 122 will act as a locking key for the blade 111 and plate 116, when held against lateral movement by the eccentric washers 162. It will also be apparent that the assembly 122 is readily removed from the cutter assembly by turning one or the other of said washers 162 to uncover the aperture, whereby the assembly 122 is readily withdrawn. The cutter blade 111 is likewise readily removed from the rails, by removal of the end plate 130.

It will be seen that at any time access to the knives is desired, the hopper shroud may be quickly lifted from the frame and apparatus thereof. In practice, with the hopper in place one or more potatoes, prepared as by peeling are placed in the hopper, whence several roll into the magazine. The lowermost potato falls by gravity upon the plate 116, whenever the plate and blade are retracted. Thereafter repeated reciprocatory motion of the slicing knives quickly, and on each pass produces a slice and the sectioning thereof to form the requisite lengthwise sectional shapes suitable for french frying. During the slicing, the slice is confined, and during the sectioning, the sections are confined until after the sectioning knives have entered the block. The apparatus is readily maintained sanitary, cannot jam and may be started and stopped at will, as soon as a requisite order or orders of potato sections have been cut, so that fresh cut sections may be promptly prepared for immediate frying. The sequence of commencing the cut of a slice, during which the sectioning of the slice commences while the slice and sections are wholly confined produces a cutting action which avoids bruising the potato, and provides uniform sections, best adapted for uniform frying.

It will be seen that the apparatus is rugged, readily serviced and readily maintained sanitary.

While a single modification of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A potato slicer for forming potato sections for french fries comprising, an open bottom magazine, a reciprocating blade assembly adapted to travel across the open bottom thereof, said blade assembly comprising a slicing blade having a cutting edge at one end, a supporting plate disposed below said slicing blade in parallel relation thereto and spaced therefrom by a predetermined thickness of potato slice, and a plurality of uniformly spaced sectioning blades disposed perpendicular to said blade and plate and extending between the facing surfaces thereof and lying in planes parallel to the reciprocating motion of the assembly, said sectioning blades having cutting edges disposed behind the cutting edge of the slicing blade a distance at least as great as the spacing between the slicing blade and the supporting plate, and said support plate terminating substantially at the sectioning blades, and extending forward of the slicing blade by a length sufficient to cover the bottom of said magazine when said assembly is positioned to initiate a slicing stroke, and a blade block fixed in relation to said magazine having an abutment surface disposed flush with a wall of said magazine and of a height slightly less than the distance between the facing surfaces of said blade and plate, said block having slots of a depth to receive all of said blades, when the end of said plate at said sectioning blades is advanced beyond the abutment surface.

2. A potato slicer for forming potato sections for french fries comprising, a frame an open bottom magazine supported on said frame, a pair of parallel guide rods mounted on said frame and disposed laterally of said magazine, a blade assembly slidably disposed on said rods and adapted to travel across the open bottom thereof, a motor having a crank and connecting rod connected to said blade assembly mounted in said frame, said blade assembly comprising a slicing blade having a cutting edge at one end, a supporting plate disposed below said slicing blade in parallel relation thereto and spaced therefrom by a predetermined thickness of potato slice and a plurality of uniformly spaced sectioning blades disposed perpendicular to said blade and plate and extending between the facing surfaces thereof and lying in planes parallel to the reciprocating motion of the assembly, said sectioning blades having cutting edges disposed behind the cutting edge of the slicing blade a distance at least as great as the spacing between the slicing blade and the supporting plate, and said support plate terminating substantially at the sectioning blades, and extending forward of the slicing blade by a length sufficient to cover the bottom of said magazine when said assembly is positioned to initiate a slicing stroke, and a blade block mounted on said frame and fixed in relation to said magazine and having an abutment surface disposed flush with a wall of said magazine and of a height slightly less than the distance between the facing surfaces of said blade and plate, said block having slots of a depth to receive all of said blades, when the end of said plate at said sectioning blades is advanced beyond the abutment surface.

3. A potato slicer for forming potato sections for french fries comprising, a frame, an open bottom magazine supported on said frame, a pair of parallel guide rods mounted on said frame and disposed laterally of said magazine, a blade assembly slidably disposed on said rods an adapted to travel across the open bottom thereof, a motor having a crank and connecting rod connected to said blade assembly mounted in said frame, said blade assembly comprising a slicing blade having a cutting edge at one end, a supporting plate disposed below said slicing blade in parallel relation thereto and spaced therefrom by a predetermined thickness of potato slice and a plurality of uniformly spaced sectioning blades disposed perpendicular to said blade and plate and extending between the facing surfaces thereof and lying in planes parallel to the reciprocating motion of the assembly, said sectioning blades having cutting edges disposed behind the cutting edge of the slicing blade a distance at least as great as the spacing between the slicing blade and the supporting plate, and said support plate terminating substantially at the sectioning blades, and extending forward of the slicing blade by a length sufficient to cover the bottom of said magazine when said assembly is positioned to initiate a slicing stroke, a blade block mounted on said frame and fixed in relation to said magazine and having an abutment surface disposed flush with a wall of said magazine and of a height slightly less than the distance between the facing surfaces of said blade and plate, said block having slots of a depth to receive all of said blades, when the end of said plate at said sectioning blades is advanced beyond the abutment surface, and a chute mounted on the frame and disposed below said blade assembly and magazine, and extending to one side of said frame.

4. A potato slicer in accordance with claim 3 having a shroud surrounding the frame, with an opening in the side thereof in alignment with the chute, said shroud having a cover comprising a hopper having an opening in alignment with said magazine.

5. A potato slicer for forming potato sections for french fries comprising, an open bottom magazine, a reciprocating blade assembly adapted to travel across the open bottom thereof, said blade assembly comprising a frame having side members, a slicing blade having a cutting edge at one end and having its side edges recessed in one end of said side members, a supporting plate disposed below said slicing blade in parallel relation thereto and spaced therefrom by a predetermined thickness of potato slice and having its side edges recessed in said side members and extending to the other end of said side members, and a plurality of uniformly spaced sectioning blades disposed perpendicular to said blade and plate and extending between top and bottom blade support members, said blade and plate having facing transverse grooves in which said support members lie in flush relation to the facing surfaces of said blade and plate, said sectioning blades having cutting edges disposed behind the cutting edge of the slicing blade a distance at least as great as the spacing between the slicing blade and the supporting plate, and said supporting plate terminating substantially at the sectioning blades, and extending forward of the slicing blade by a length sufficient to cover the bottom of said magazine when said assembly is positioned to initiate a slicing stroke, a blade block fixed in relation to said magazine and having an abutment surface disposed flush with a wall of said magazine and of a height slightly less than the distance between the facing surfaces of said blade and plate, said block having slots of a depth to receive all of said blades, when the end of said plate at said sectioning blades is advanced beyond the abutment surface, and an aperture in at least one of said side members aligned with said transverse grooves, into which one end of each of said blade support members extends, whereby the blade support members and the sectioning blades are removable laterally from the assembly through said aperture.

References Cited in the file of this patent

UNITED STATES PATENTS

| | | |
|---|---|---|
| 2,473,165 | McKinney | June 14, 1949 |
| 2,592,832 | Strand | Apr. 15, 1952 |
| 2,807,299 | Steinmetz | Sept. 24, 1957 |
| 3,030,992 | Picard | Apr. 24, 1962 |